United States Patent
McIntosh et al.

[15] 3,662,949
[45] May 16, 1972

[54] PRESSURE TEMPERATURE RELIEF VALVE

[72] Inventors: Harold A. McIntosh, South Pasadena; Theodore J. Dykzeul, Rolling Hills; Gordon K. Slocum, Downey; William D. Rattan, Paramount; Donald K. Murrell, La Mirada, all of Calif.

[73] Assignee: Robertshaw Controls Company, Richmond, Va.

[22] Filed: Aug. 6, 1970

[21] Appl. No.: 61,557

[52] U.S. Cl. ............................ 236/92, 137/522, 138/108, 236/100, 248/65, 251/367
[51] Int. Cl. ............................ G05d 27/00, G05d 23/275
[58] Field of Search .................. 236/101, 92, 100; 137/522, 137/543.12, 515.5; 251/367; 267/179; 248/65; 138/108, 113, 114

[56] References Cited

UNITED STATES PATENTS

| | | |
|---|---|---|
| 2,461,982 | 2/1949 | Horne..............................236/92 X |
| 2,747,802 | 5/1956 | Kmiecik..........................236/92 C |
| 1,775,055 | 9/1930 | Tarbox et al....................285/330 X |
| 3,503,262 | 3/1970 | Staire.............................236/100 X |
| 3,336,128 | 1/1968 | Feinberg........................236/92 X |
| 3,330,480 | 7/1967 | Drapeau et al.................236/100 |
| 2,161,284 | 6/1939 | Crowell..........................137/543.13 X |

*Primary Examiner*—William E. Wayner
*Attorney*—Anthony A. O'Brien

[57] ABSTRACT

A relief valve including a T-shaped casing having a first port with an insert member secured therein having a conical wall forming a valve seat in a chamber communicating with the first port and a second outlet port, a valve member cooperating with the valve seat and loosely attached with a valve stem extending through a third port axially aligned with the first port, a thermostat assembly, and a retainer for holding the thermostat assembly and including clips engageable with a register groove and shoulder in the insert member.

25 Claims, 9 Drawing Figures

Patented May 16, 1972

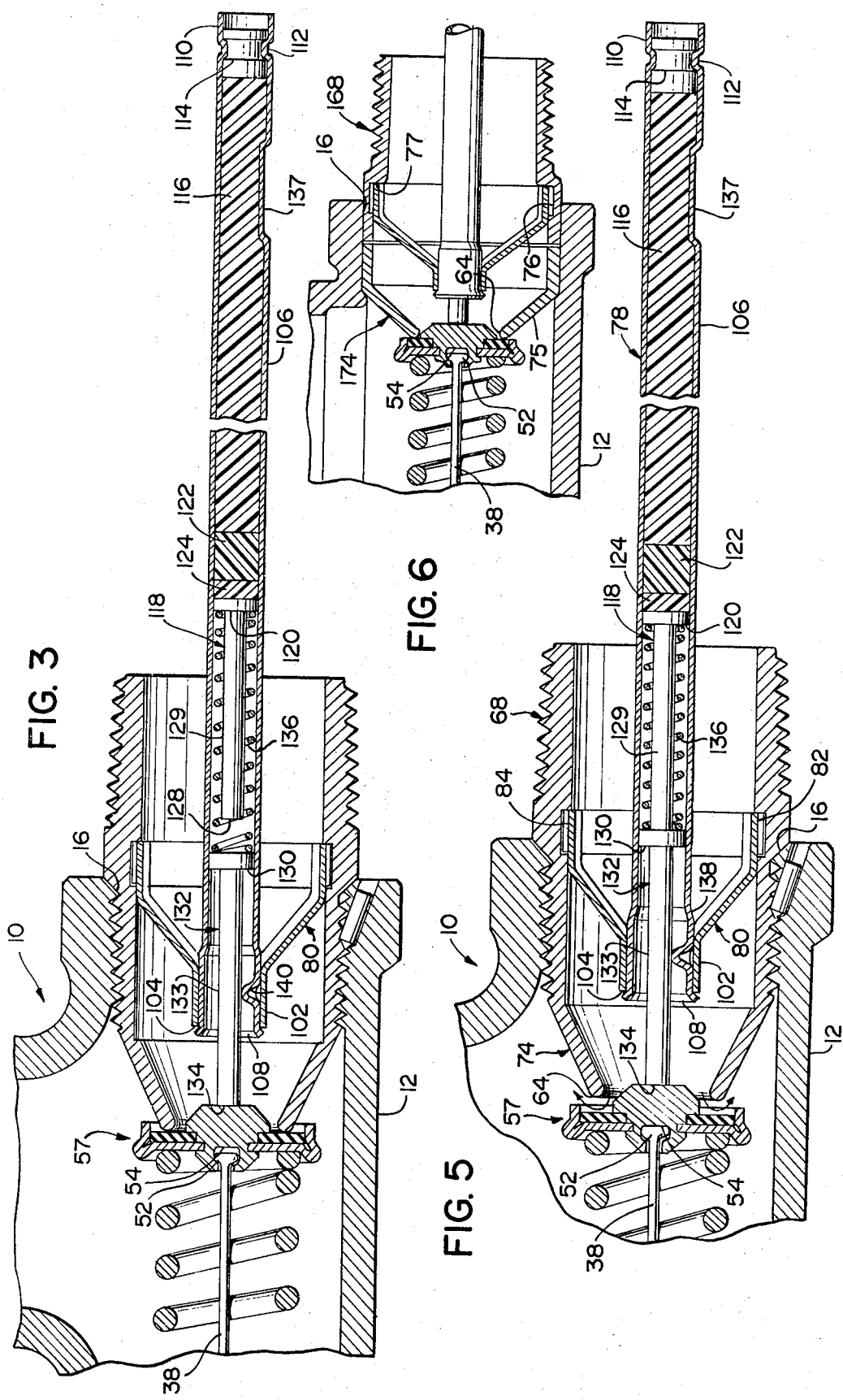

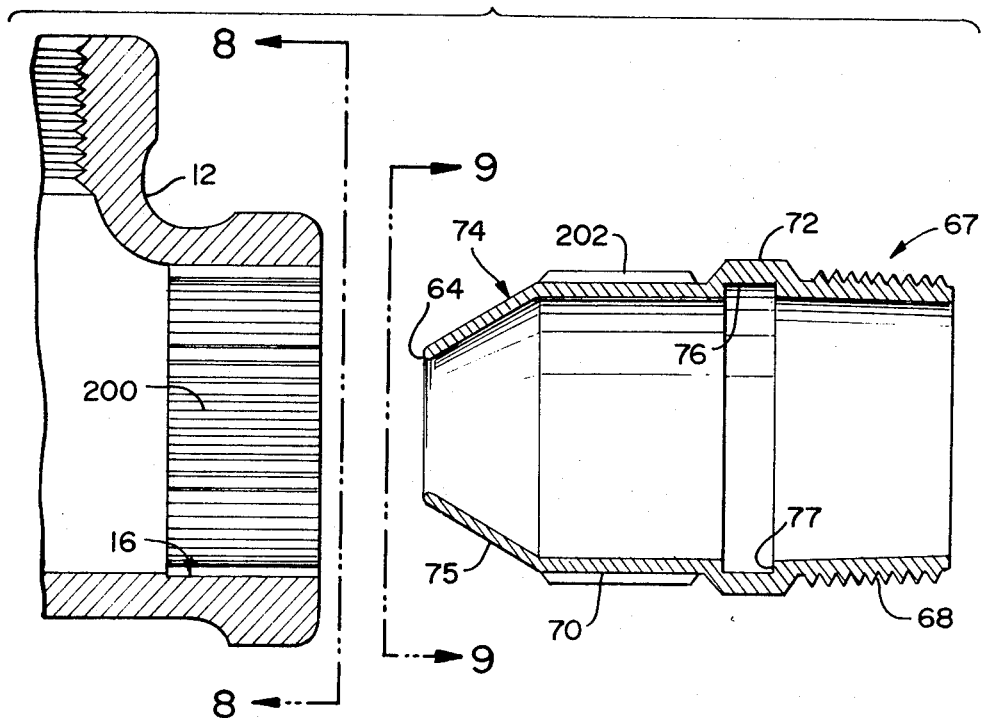
FIG. 7
FIG. 8
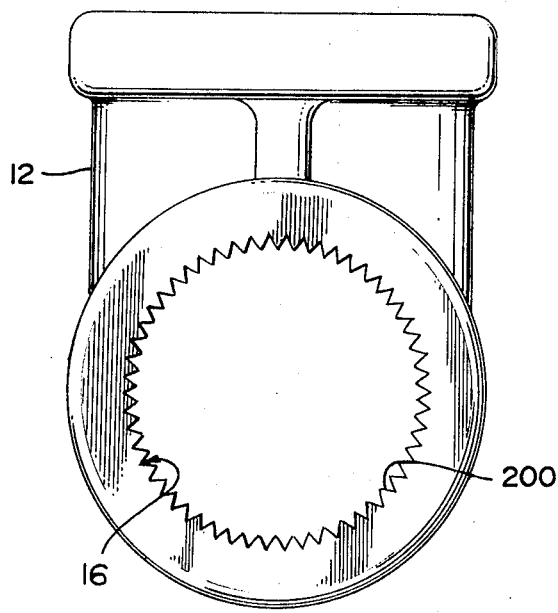
FIG. 9
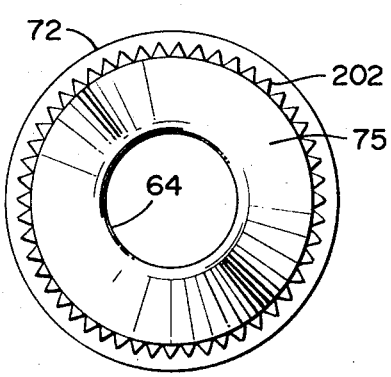

PRESSURE TEMPERATURE RELIEF VALVE

BACKGROUND OF THE INVENTION

1. Field of the Invention:

The present invention pertains to relief valves and, more particularly, to pressure and temperature relief valves for use with water heaters.

2. Description of the Prior Art:

Pressure and/or temperature relief valves are commonly used with water heaters to prevent damage caused by high pressures or temperatures within the water heater. For instance, when the pressure in a water heater exceeds a predetermined high limit value the relief valve will open to provide an outlet to drain hot water or steam from the water heater. The escape of the hot water or steam relieves the pressure within the water heater and maintains the pressure below the predetermined high limit value. In a similar manner, the relief valve maintains the water temperature in the water heater below a predetermined high limit value in response to a thermostat assembly which extends into the water heater to sense water temperature. The relief valve opens when the water temperature exceeds the predetermined high limit value to drain hot water or steam from the water heater and reduce the water temperature in the water heater.

Relief valves of the prior art have the disadvantage of being relatively expensive in that the casings for the valves are specially designed and cast to provide a valve seat within a chamber in the casing. The expense of prior art relief valves is also high due to the intricate assembly techniques required to properly insert and align the valve structure and the thermostat assembly within the valve casing. In the past, if it was desired to decrease assembly costs without specially casting a single component casing, a casing was specially casted in two or more parts such that the valve structure and the temperature sensing structure could be assembled and the parts of the casing secured together thereafter; however, this increases material costs with respect to the casing as well as requiring added labor to assemble the casing.

The expense of prior art relief valves is further increased due to the necessity that the casing and valve components be constructed of corrosion resistant materials. This is, in conventional relief valves, the casing and valve components are normally in contact with water even when not relieving; and, accordingly, corrosion resistant materials must be utilized to protect the casing and valve components and provide long operating lives therefor.

U. S. Pat. No. 3,366,128 to Feinberg is generally cognizant of the above mentioned disadvantages and has attempted to overcome these disadvantages by utilizing a valve seat assembly that may be inserted through a port in the relief valve casing. It is noted, however, that the relief valve casing must be specially cast and must be made of a corrosion resistant material since it is in continuous contact with the medium to be controlled regardless of whether the valve is relieving.

SUMMARY OF THE INVENTION

The present invention is generally summarized in a relief valve including a casing having a first port, a second port defining an outlet and a chamber in communication therewith, a valve seat disposed in the chamber, a valve member forced towards the valve seat, and an insert member secured in the first port to define an inlet and including a wall forming the valve seat whereby the casing comes into contact with a medium only when the relief valve is relieving.

It is a general object of the present invention to inexpensively produce a relief valve.

Another object of the present invention is to utilize a commercially available pipe Tee as a casing for a relief valve.

A further object of the present invention is to provide a valve seat in a casing for a relief valve by securing an insert member having a wall forming the valve seat in a port in the casing.

The present invention has another object in that an insert member having a nipple portion and a valve seat portion is inserted in a port of a commercially available pipe Tee.

A further object of the present invention is to register the position of a thermostat assembly with an insert member forming a valve seat such that the insert member may be secured in an inlet of a casing for a pressure and temperature relief valve with accurate alignment of the valve seat and thermostat assembly.

Another object of the present invention is to construct a retainer for firmly supporting a thermostat assembly in an inlet of a relief valve while providing minimum flow restriction.

Some of the advantages of the relief valve of the present invention over the prior art are that the valve casing is commercially available and need not be specially cast, a valve seat is simply positioned in the casing in assured relation with a thermostat assembly due to a retainer for the thermostat assembly engaging register means on an insert member forming the valve seat, assembly of the valve is accurately and inexpensively accomplished, and the cost of materials for constructing the valve is reduced.

Further objects and advantages of the present invention will become apparent from the following description of the preferred embodiments taken in conjunction with the accompanying drawings.

BRIEF DESCRIPTION OF THE DRAWINGS

FIG. 3 is a broken, sectional view of the thermostat assembly of FIG. 1.

FIG. 5 is a broken, sectional view of the thermostat assembly of FIG. 3 when a high limit temperature is sensed.

FIG. 6 is a broken, sectional view of a modification of the relief valve of FIG. 1.

FIG. 7 is a broken exploded view of another modification of the relief valve of FIG. 1.

FIG. 8 is a view taken along line 8—8 of FIG. 7.

FIG. 9 is a view taken along line 9—9 of FIG. 7.

DESCRIPTION OF THE PREFERRED EMBODIMENTS

Figure 1:
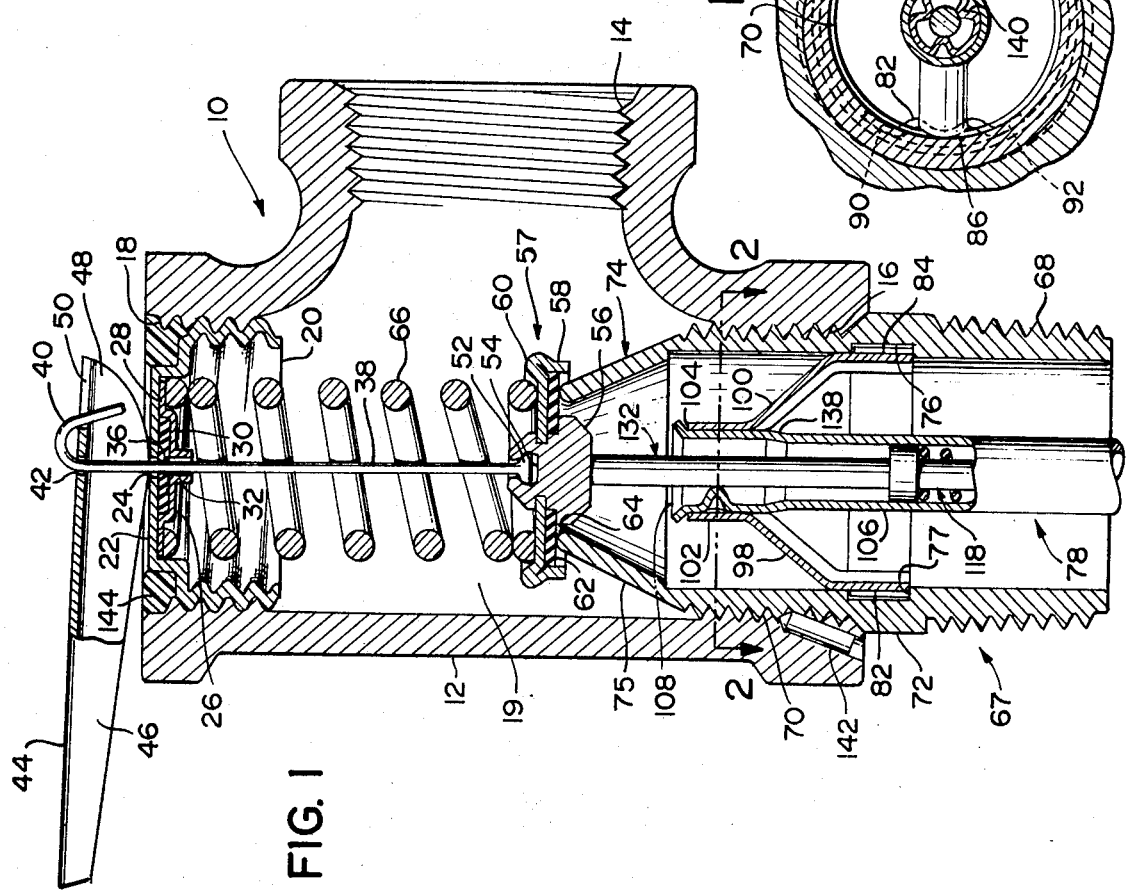
FIG. 1 is a broken, sectional view of a relief valve according to the present invention.

A relief valve 10 according to the present invention is illustrated in FIGS. 1 and 3 in its normally closed state when normal operating pressure and temperature conditions exist at a water heater, not shown. Valve 10 includes a casing 12 in the form of a standard, commercially available pipe Tee of galvanized malleable iron. Casing 12 has an internally threaded port 14, an internally threaded port 16 and an internally threaded port 18 oppositely disposed and axially aligned with port 16. A central chamber 19 communicates with port 16 and port 14, and port 14 is adapted to be connected with a pipe leading to a drain to provide an outlet to discharge steam and water from the water heater when valve 10 is opened.

A hollow, cylindrical, externally threaded adjustment plug 20, made of brass or steel, is screwed into port 18. Adjustment plug 20 has a round, flat top 22 with a centrally disposed aperture 24 therein, and a plate 26 has an annular flange 28 seated against the underside of top 22. Flange 28 terminates in an offset portion 30 which has a centrally disposed collar 32 extending therefrom and defining an opening aligned with aperture 24 in adjustment plug 20. A rubber seal 34 is disposed between the underside of top 22 of adjustment plug 20 and offset portion 30 of plate 26, and a centrally disposed aperture 36 in seal 34 is axially aligned with aperture 24 and collar 32.

A valve stem 38 extends through apertures 24 and 36 and collar 32 to an end 40 which extends through an aperture 42 in a manually operated lever 44. Lever 44 has sides 46 and 48 which are rounded to rock or pivot against the top 22 of adjustment plug 20. The end 40 of valve stem 38 is bent to extend through an axially disposed slot 50 in the top of lever 44.

The other end of valve stem 38 is headed to form a bulbous head 52 captured in a cavity 54 in the upper portion of a valve disc 56 which is part of a valve member, generally indicated 57. Cavity 54 is larger than head 52 to permit relative movement between valve member 57 and valve stem 38. Valve disc 56 is staked over a retainer 58 which is cup-shaped with an arcuate edge 60 extending therearound. An annular valve face 62 rests on an annular shoulder of valve disc 56 and is held by retainer 58, and the underside of valve face 62 cooperates with the arcuate end of an annular valve seat 64. A coiled bias spring 66 is mounted in compression between flange 28 of plate 26 and the upper side of retainer 58 and centered by arcuate edge 60.

A generally cylindrical insert member 67 has an externally threaded nipple portion 68 which is adapted to threadedly engage an outlet of the water heater and an externally threaded shank 70 disposed above and separated from nipple portion 68 by an annular, thickened portion 72 which is adapted to abut an outer edge of port 16. Insert member 67 includes a valve seat portion 74 having a frusto-conical wall 75 extending from the upper edge of the cylindrical shank 70 and wall 75 has an arcuate open end defining valve seat 64. An annular register groove 76 is centrally disposed in portion 72, and the inner diameter of nipple portion 68 is smaller than the inner diameter of valve seat portion 74 to form a register shoulder 77 coinciding with the bottom of groove 76. Shank 70 is screwed into inlet port 16 of casing 12 such that valve seat 64 is positioned in central chamber 19 of the casing.

Figure 2:
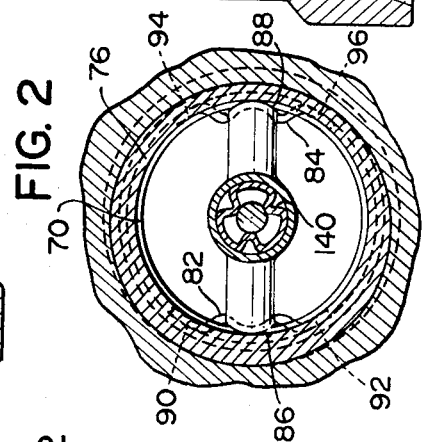
FIG. 2 is a cross-section of the thermostat assembly retainer of FIG. 1 taken along line 1—2.

A thermostat assembly 78 is held in position with respect to insert member 67 by means of a retainer 80 which has curved clips 82 and 84 disposed on opposite sides of the bottom thereof and inserted in register groove 76 abutting shoulder 77. As is illustrated in FIG. 2, clips 82 and 84 are similar and have upstanding central portions 86 and 88 with a pair of curved legs 90, 92, and 94, 96 offset therefrom, respectively. The outer diameter of the offset legs is the same as the diameter of register groove 76, and the diametric distance between central portions 86 and 88 corresponds to the inner surface diameter of valve seat portion 74 of insert member 67. Central portions 86 and 88 are generally U-shaped in cross-section and extend above the offset legs to arms 98 and 100, respectively, which extend angularly to a centrally disposed, cylindrical collar 102 having an annular shoulder 104 at the top thereof. The widths of arms 98 and 100 are relatively small in comparison to the cross sectional area of insert member 67 to minimize flow restriction while providing maximum support strength.

As best shown in FIG. 3, thermostat assembly 78 includes an elongated tubular housing 106 made of a heat conductive material such as copper and having a flared open end 108 and a sealed end 110 which is circumferentially crimped at 112 to capture a brass plug 114. A thermally responsive plastic material 116, such as polyethylene, is disposed in casing 106 to abut the inner face of plug 114 at a fixed end, and an actuator pin 118 has a head 120 spaced from the movable end of plastic material 116 by a silicone rubber plug 122 and a washer 124 made of polytetrafluoroethylene. An end 128 of a rod 129 extending from head 120 of pin 118 is spaced from a head 130 of another actuator pin 132 which has a rod 133 extending from head 130 with an end 134 engaging the bottom of valve disc 56. A coiled bias spring 136 is mounted in compression between head 120 of pin 118 and head 130 of pin 132 to force pin 118 against washer 124 and pin 132 against valve disc 56.

Housing 106 is crimped at 137 near sealed end 110 in order to calibrate the thermostat assembly such that the space between pins 118 and 132 will be closed when the temperature sensed is equal to a predetermined high limit temperature. The diameter of housing 106 is increased at a portion 138 before flaring at open end 108, and the outer diameter of portion 138 corresponds to the inner diameter of collar 102 such that the flared end 108 abuts shoulder 104 and collar 102 holds portion 138 to maintain the thermostat assembly in axial alignment with the valve assembly. Portion 138 has three symmetrically spaced dimples 140 therein to axially guide actuator pin 132.

Thermally responsive plastic material 116 may be any plastic material which expands and contracts with increasing and decreasing temperatures, respectively. Such expansion and contraction may be linear or may involve a change of state as is the case with polyethylene which begins to change from a solid or crystalline state to a liquid or amorphous state at approximately 122° F. and completes the change of state at approximately 239° F. The slope of a curve of cubic expansion of polyethylene versus temperature is greatest between 200° and 210° F.; and, since this is the normal high limit temperature range for water heaters, polyethylene is an extremely desirable plastic material for sensing temperatures.

In order to assemble relief valve 10, insert member 67 is screwed into port 16 to position valve seat 64 in chamber 19 in casing 12, and a locking pin 142 is inserted in an angled bore in the face of port 16 in order to secure insert member 67 in place. Retainer 80 is then pushed into nipple portion 60 of the insert member until clips 82 and 84 snap into place in register groove 76 abutting shoulder 77. Thermostat assembly 78 is now forced through collar 102 of retainer 80 such that flanged open end 108 of housing 106 abuts shoulder 104 of collar 102. Valve member 57 with valve stem 38 loosely attached thereto by means of headed end 52 is inserted in casing 12 to engage valve seat 64, and spring 66, plate 26, seal 34 and plug 20 are disposed over valve stem 38 with plug 20 being rotated to adjust the force from bias spring 66 commensurate with desired relieving pressure. After adjustment of plug 20, valve stem 38 is bent to form end 40, and an epoxy fill 144 is inserted over the top of plug 20 to maintain it in its properly adjusted position. Thermostat assembly 78 is calibrated commensurate with desired relieving temperature by crimping end 110 of housing 106, and relief valve 10 may now be secured to a water heater or other appliance for operation.

It will be appreciated that the sequence of assembly steps may be varied, for instance, by assembling thermostat assembly 78 and retainer 80 with insert member 67 prior to inserting member 67 in port 16 or by assembling thermostat assembly 78 with retainer 80 and forcing the resulting subassembly into insert member 67 which has previously been positioned in port 16. In view of the varying assembly steps mentioned above, it can be seen that, while it is advantageous to form retainer 80 as an insertable clip, similar retainer means could be formed integrally with insert member 67 to properly position thermostat assembly 67 while providing minimum flow restriction.

Thus, it may be seen that the cost of components and assembly is materially reduced since a standard commercially available pipe Tee is utilized for the casing and no intricate assembly is required within the casing. That is, the thermostat subassembly is assembled before insertion in the casing and is accurately aligned with respect to the valve member and valve seat since register groove 76 and shoulder 77 accurately position retainer 80 and, accordingly, precisely place end 134 of pin 132 in abutment with the bottom of valve disc 56.

In operation, housing 106 extends into the water in the water heater to sense the temperature thereof. The space between pins 118 and 132 permits operation of the water heater within its normal temperature range; however, if the temperature exceeds the normal range and the predetermined high limit value, plastic material 116 will expand sufficiently to cause the movable end thereof to displace pin 118 to close the space as shown in FIG. 5. Pin 118 will push pin 132 such that end 134 thereof moves valve member 57 away from valve seat 64 against the force from spring 66 to permit the discharge of hot water and steam through insert member 67, which defines an inlet, and outlet port 14 of casing 12 to reduce the temperature of the water and prevent hazardous conditions from developing. It will be appreciated that the structure of retainer 80 permits flow thereby without undue restriction. Once the temperature sensed by the thermostat assembly drops below the high limit value, plastic material 116 will contract to lower pin 132 and permit valve member 57 to engage valve seat 64 to stop flow through the casing.

Silicone rubber plug 122 prevents extrusion of the plastic material 116, and, similarly, washer 124 prevents extrusion of silicone rubber plug 122 past head 120 of pin 118 at elevated temperatures. Flared end 108 of housing 106 is maintained snugly against upper shoulder 104 due to the force from spring 136 to minimize adverse effects on calibration caused by lime deposits or foreign matter lodging therebetween, and spring 136 also maintains a light, compressive force on head 120, washer 124 and plug 122 to keep them in place.

If pressure in the water heater increases to a predetermined high limit value as adjusted by plug 20, the upstream pressure on valve member 57 will be greater than the downstream pressure as determined by the force from spring 66. Valve member 57 will, accordingly, be moved upwards against the force of spring 66 to thereby open the valve and permit hot water and steam to escape through the inlet defined by insert member 67 and outlet port 14 to reduce the pressure in the water heater. When the pressure in the water heater decreases below the high limit value, the force from spring 66 will move valve member 57 against valve seat 64 to close the relief valve and stop flow through casing 12.

Figure 4:
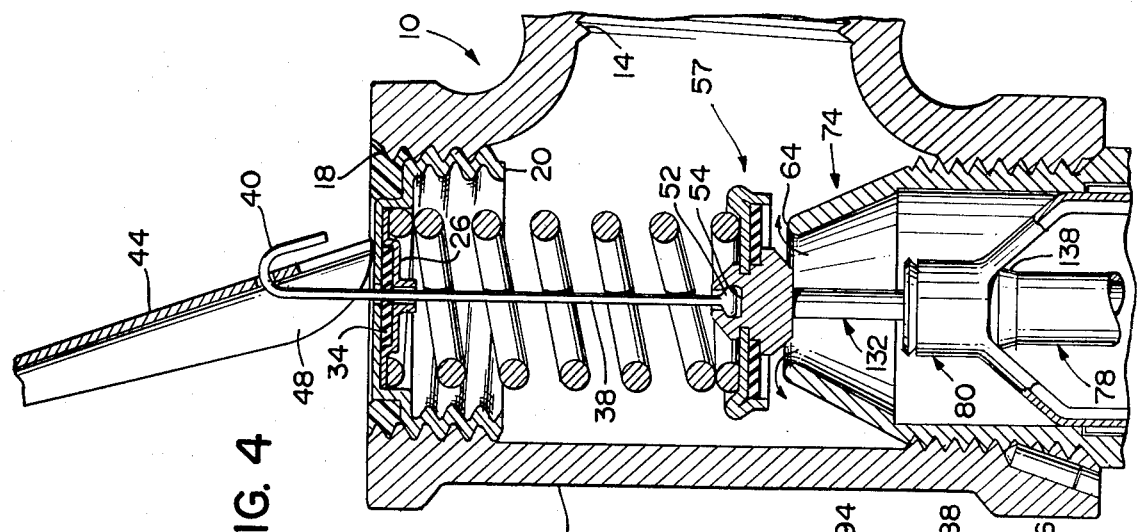
FIG. 4 is a broken, sectional view of the relief valve of FIG. 1 after manual opening.

If it is desired to manually open relief valve 10 due to malfunction thereof or for any other reason, lever 44 is pivoted upwards, as illustrated in FIG. 4, to pull valve stem 38 up and move valve member 57 away from valve seat 64 once the lost motion of the coupling of head 52 and cavity 54 is overcome.

It will be appreciated that thermostat assembly 78, retainer 80, insert member 67 and valve member 57 are the only components of relief valve 10 which continually come into contact with water and, therefore, are required to be made of corrosion resistant materials. Thus, the use of a standard, commercially available pipe Tee for casing 12 is made possible since the casing comes into contact with water only when valve 10 is relieving and is not subject to pressure as the inlet and valve seat are one piece. The loose coupling between valve stem 38 and valve member 57 permits movement of the valve member relative to the valve stem to provide self alignment and insure affective valve seating. The conical configuration of wall 75 of insert member 67 reduces flow restriction and the accumulation of lime and mineral deposits which tend to restrict flow.

A modification of the present invention is illustrated in FIG. 6 and parts thereof identical to parts of the previously described embodiment are given identical reference numbers and are not described again. Parts of the embodiment of FIG. 6 which are similar to parts of the previously described embodiment are given reference numbers with 100 added.

The primary difference between he previously described embodiment and the embodiment of FIG. 6 is that the insert means includes an individual nipple piece 168 and an individual valve seat piece 174 which are secured in inlet port 16 of casing 12. Valve seat piece 174 has the same physical dimensions as valve seat portion 74 of insert member 67 to define valve seat 64 at the end of frusto-conical wall 75, and nipple piece 168 has the same physical dimensions as nipple portion 68 of insert member 67 including register groove 76 and shoulder 77. The outer surface of the abutting portions of the nipple and valve seat sections are not threaded nor is inlet 16 threaded.

In assembly, valve seat piece 174 is first brazed to the upper portion of inlet port 16 to position valve seat 64 within the casing, and nipple piece 168 is then brazed in inlet 16 with its upper end abutting the lower end of valve seat piece 174 such that register groove 76 and shoulder 77 are accurately aligned with valve seat 64. The thermostat subassembly is then forced into nipple section 168 until clips 82 and 84 spring into place over shoulder 77 and into groove 76.

Another modification of the present invention is illustrated in FIGS. 7, 8 and 9 wherein identical reference numbers are used to identify parts identical to parts of the embodiment of FIG. 1, which parts are not described again. The primary difference between the embodiment of FIGS. 7, 8 and 9 and the embodiment of FIG. 1 is the manner in which insert member 67 is secured in port 16 of casing 12. The existing threads in port 16 of the pipe Tee defining casing 12 are reamed out, and thereafter axial serrations 200 are broached into the inner surface of port 16, as best shown in FIG. 8. Similarly, the outer surface of shank 70 of insert member 67 is broached to provide axial serrations 202, as best shown in FIG. 9. Insert member 67 is pressed into casing 12 such that the serrated edges in port 16 and shank 70 are interengaged thereby providing a press-fit assembly which resists torques in either direction to maintain the calibrated relieving pressure and temperature and facilitate assembly. Shank 70 may also be knurled to provide the same torque resistance.

The relief valve 10 may, of course, be utilized without thermostat assembly 78 while retaining the advantages attendant the unique structure of the present invention. That is, where temperature relief is not required, retainer 80 and thermostat assembly 78 need not be inserted in insert member 67; and, of course, the insert member need not be formed with register groove 76 and shoulder 77.

It may be seen that the present invention utilizes a standard commercially available pipe Tee for a valve casing and the internal structure for providing an accurately positioned valve seat is provided by insert means which also provides a nipple portion for connection with an outlet of a water heater. The thermostat assembly is held by a retainer which cooperates with register means on the insert means such that accurate alignment of the thermostat assembly with the valve seat is assured.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A pressure and temperature relief valve comprising
   an internal T-shaped casing having a first port, a second port axially aligned with said first port, a third port defining an outlet for said casing, and a single chamber communicating with said ports;
   an adjustment plug secured to said first port;
   insert means secured in said second port and defining an inlet for said casing, said insert means including a wall extending into said chamber to define a valve seat and an inner surface defining register means;
   a valve member cooperating with said valve seat to control flow between said inlet port and said outlet;
   bias means forcing said valve member toward said valve seat;
   valve stem means loosely attached to said valve member and having an external end extending through said adjustment plug;
   lever means engaging said external end of said valve stem means to permit manual opening of said pressure and temperature relief valve;
   a thermostat assembly including temperature sensing means and actuator means controlled by said temperature sensing means for engaging said valve member to move said valve member away from said valve seat when said temperature sensing means senses a predetermined high limit temperature; and
   retainer means including a collar holding said thermostat assembly, a plurality of spaced arms angularly extending from said collar, a plurality of spaced clips, one for each arm, each of said clips being engaged with said register means whereby said thermostat assembly is accurately aligned with said valve seat and said valve member.

2. The invention as recited in claim 1 wherein said insert means is a single component having a valve seat portion including said wall and a first inner surface having a first diameter, and a nipple portion including an externally threaded outer surface and a second inner surface having a second diameter smaller than said first diameter, and said register means includes an annular groove in said first inner surface and an annular shoulder aligned with said groove and formed by the meeting of said first and second inner surfaces.

3. The invention as recited in claim 2 wherein said second port is internally threaded, and said single component includes an externally threaded shank threadedly engaging said second port.

4. The invention as recited in claim 1 wherein said insert means includes a valve seat piece including said wall and a nipple piece including an externally threaded outer surface and an inner surface forming an annular shoulder and having an annular groove therein aligned with said shoulder, and said register means includes said shoulder and said groove.

5. The invention as recited in claim 4 wherein said valve seat piece and said nipple piece are brazed into said second port.

6. The invention as recited in claim 4 wherein said insert means has a shank portion with an axially serrated external surface, and said second port has an axially serrated inner surface engaging said shank portion with a press fit.

7. The invention as recited in claim 1 wherein said thermostat assembly includes a tubular housing having a sealed end and a flared open end, and said collar has an upper shoulder abutting said flared open end of said tubular housing.

8. The invention as recited in claim 6 wherein said insert means has an inner surface, said register means includes an annular groove and an annular shoulder in said inner surface, and said plurality of clips includes first and second oppositely disposed clips, said first and second clips each including a central portion and first and second legs offset on either side of said central portion, said central portions abutting said shoulder and said first and second legs being inserted in said groove.

9. The invention as recited in claim 7 wherein said tubular housing is circumferentially crimped at said sealed end to capture a plug, said temperature sensing means is disposed in said tubular housing and includes a thermally responsive plastic material having a movable end and a fixed end abutting said plug, and said actuator means is disposed in said tubular housing and includes a first actuator pin having a first head controlled by said movable end of said plastic material and a first rod extending from said first head and a second actuator pin having a second head spaced from said first rod and in axial alignment therewith and a second rod extending from said second head through said open end of said tubular housing to abut said valve member.

10. The invention as recited in claim 8 wherein said plastic material is polyethylene, said actuator means includes a bias spring mounted in compression between said first and second heads, a silicone plug disposed adjacent said movable end of said polyethylene and a polytetrafloroethylene washer disposed adjacent said silicone plug and said first head of said first extension pin, and said tubular housing has a plurality of dimples therein near said open end to guide said second rod.

11. The invention as recited in claim 9 wherein said first port of said casing is internally threaded, said adjustment plug is externally threaded and threadedly engages said first port, and said bias means includes a coiled spring mounted in compression between said adjustment plug and said valve member.

12. A pressure and temperature relief valve comprising
an integral pipe Tee forming a casing for said valve, said pipe Tee having a first port, a second port axially aligned with said first port, a third port defining an outlet for said casing and a single chamber in communication with all said ports;
insert means secured in said first port and defining an inlet, said insert means including a wall forming a valve seat within said chamber and an inner surface defining register means;
a valve member cooperating with said valve seat to control flow between said inlet and said outlet;
bias means forcing said valve member toward said valve seat;
a thermostat assembly including temperature sensing means and actuator means for engaging said valve member and movable to control the position thereof with respect to said valve seat in response to temperature variations, said actuator means being controlled by said temperature sensing means to move said valve member away from said valve seat when a predetermined high limit temperature is sensed by said temperature sensing means; and
retainer means for holding said thermostat assembly and including clip means engaged with said register means to position said retainer means in said insert means whereby said thermostat assembly is accurately aligned with said valve seat and said valve member.

13. The invention as recited in claim 12 wherein said thermostat assembly includes a tubular housing and said retainer means includes a collar holding said tubular housing.

14. The invention as recited in claim 13 wherein said tubular housing has a flared open end, and said collar has an upper shoulder abutting said flared end.

15. The invention as recited in claim 14 wherein said register means includes a shoulder on the inner surface of said insert means, and said clip means abuts said shoulder.

16. The invention as recited in claim 15 wherein said register means includes a groove in the inner surface of said insert means aligned with said shoulder, and said clip means is inserted in said groove.

17. The invention as recited in claim 16 wherein said clip means includes first and second clips, each of said first and second clips having a central portion connected with said collar by an inwardly extending arm, and first and second curved legs offset on either side of said central portion, said first and second legs being inserted in said groove, and said central portion abutting said shoulder.

18. The invention as recited in claim 17 wherein said tubular housing has a sealed end, said temperature sensing means includes a thermally responsive plastic material disposed in said tubular housing to define a fixed end adjacent said sealed end and a movable end, and said actuator means is disposed in said tubular housing to abut said movable end of said plastic material and extends out of said flared open end of said tubular housing.

19. The invention as recited in claim 18 wherein said actuator means includes a first actuator pin having a first head and a first rod extending therefrom, a second actuator pin having a second head and a second rod extending therefrom through said open end of said tubular housing to engage said valve member, and a bias spring mounted in compression between said first head and said second head to space said first rod from said second head when normal operating temperatures are sensed and to permit said first rod to contact said second head when the predetermined high limit temperature is sensed.

20. The invention as recited in claim 19 wherein said plastic material is polyethylene, and said actuator means includes a silicone plug abutting said movable end of said polyethylene and a polytetrafloroethylene washer abutting said first head and said silicone plug.

21. The invention as recited in claim 12 wherein said wall of said insert means is frusto-conical to form said valve seat.

22. The invention as recited in claim 21 wherein said first port is internally threaded and said insert means has an externally threaded outer surface threadedly engaging said first port.

23. The invention as recited in claim 22 wherein said insert means includes an externally threaded nipple portion adapted to be connected with a water heater.

24. The invention as recited in claim 12 wherein said insert means includes a valve seat piece including said wall and a cylindrical portion secured in said first port, and a cylindrical nipple piece having a first portion secured in said first port and abutting said cylindrical portion of said valve seat piece and a second externally threaded portion adapted to be connected with a water heater.

25. The invention as recited in claim 12 wherein said insert means has a shank portion with an axially serrated outer surface; and said first port has an axially serrated inner surface engaging said shank portion with press fit.

* * * * *